United States Patent
Toyoda et al.

(10) Patent No.: US 9,906,473 B2
(45) Date of Patent: Feb. 27, 2018

(54) BEARING PERFORMANCE AUTOMATIC CALCULATION SERVICE DEVICE

(71) Applicant: NTN CORPORATION, Osaka (JP)

(72) Inventors: Satomi Toyoda, Iwata (JP); Naoshi Ohashi, Iwata (JP); Hiroshi Takiuchi, Kuwana (JP); Keiichi Ueda, Kuwana (JP)

(73) Assignee: NTN CORPORATION, Osaka (JP)

( * ) Notice: Subject to any disclaimer, the term of this patent is extended or adjusted under 35 U.S.C. 154(b) by 190 days.

(21) Appl. No.: 14/890,042

(22) PCT Filed: Apr. 21, 2014

(86) PCT No.: PCT/JP2014/061134
§ 371 (c)(1),
(2) Date: Nov. 9, 2015

(87) PCT Pub. No.: WO2014/185221
PCT Pub. Date: Nov. 20, 2014

(65) Prior Publication Data
US 2016/0127285 A1     May 5, 2016

(30) Foreign Application Priority Data
May 15, 2013  (JP) ................. 2013-102968

(51) Int. Cl.
*H04L 12/28* (2006.01)
*H04L 12/58* (2006.01)
(Continued)

(52) U.S. Cl.
CPC .......... *H04L 51/08* (2013.01); *G06Q 10/107* (2013.01); *G06Q 50/10* (2013.01)

(58) Field of Classification Search
CPC ................. H04L 51/08; H04L 51/12
See application file for complete search history.

(56) References Cited

U.S. PATENT DOCUMENTS

| 5,481,698 A | 1/1996 | Itoh et al. |
| 5,537,543 A | 7/1996 | Itoh et al. |

(Continued)

FOREIGN PATENT DOCUMENTS

| CN | 1413328 A | 4/2003 |
| EP | 1 331 580 A1 | 7/2003 |

(Continued)

OTHER PUBLICATIONS

International Search Report dated Jul. 1, 2014, in corresponding International Application No. PCT/JP2014/061134.

(Continued)

*Primary Examiner* — Adnan Mirza

(57) ABSTRACT

A bearing performance automatic calculation service device is provided which allows a user to receive an automatic calculation service at any time in any location, which easily ensures reliability in terms of leakage of transmitted/received data, and which is easily used in terms of an input operation. An e-mail address is assigned, which is used only for receiving a request for an automatic calculation service. It is determined whether authentication information and a description content of a file 5 attached to an e-mail 4 satisfy a condition. Evaluation of performance of a bearing with respect to a determined evaluation item by means of a calculation formula on the basis of the file is performed. A result of the evaluation to the file 5 is added to create a sending file. The sending file 5 is attached and sent back by the e-mail sending module 17.

6 Claims, 4 Drawing Sheets

(51) Int. Cl.
*G06Q 50/10* (2012.01)
*G06Q 10/10* (2012.01)

(56) References Cited

U.S. PATENT DOCUMENTS

| | | |
|---|---|---|
| 5,557,736 A | 9/1996 | Hirosawa et al. |
| 6,088,125 A | 7/2000 | Okada et al. |
| 6,307,643 B1 | 10/2001 | Okada et al. |
| 6,396,592 B1 | 5/2002 | Okada et al. |
| 6,876,462 B2 | 4/2005 | Okada et al. |
| 7,006,953 B2 | 2/2006 | Takemura et al. |
| 7,245,393 B2 | 7/2007 | Okada et al. |
| 2001/0013122 A1 | 8/2001 | Hirata |
| 2002/0018237 A1 | 2/2002 | Okada et al. |
| 2002/0046012 A1 | 4/2002 | Takemura et al. |
| 2004/0190053 A1 | 9/2004 | Okada et al. |
| 2012/0253897 A1 | 10/2012 | Killoran, Jr. et al. |

FOREIGN PATENT DOCUMENTS

| | | |
|---|---|---|
| EP | 0 848 539 B1 | 2/2004 |
| JP | 5-265955 | 10/1993 |
| JP | 2002-148148 | 5/2002 |
| JP | 2002-149757 | 5/2002 |
| JP | 2002-157299 | 5/2002 |
| JP | 2003-158604 | 5/2003 |
| JP | 2003-216751 | 7/2003 |
| JP | 2004-240477 | 8/2004 |
| JP | 2008-176801 | 7/2008 |

OTHER PUBLICATIONS

Bågfors, "pqm for bzr development", Nov. 1, 2005, Retrieved from internet URL: https://lists.ubuntu.com/archives/bazaar/2005q4/004571.html on Sep. 23, 2016.
Japanese Office Action dated Oct. 25, 2016 in corresponding Japanese Patent Application No. 2013-102968.
Extended European Search Report dated Oct. 13, 2016 in corresponding European Patent Application No. 14797865.4.
Chinese Office Action dated May 18, 2017 in corresponding Chinese Patent Application No. 201480026464.8.
European Office Action dated May 26, 2017 in corresponding European Patent Application No. 14 797 865.4.
International Preliminary Report on Patentability dated Nov. 26, 2015 in corresponding International Patent Application No. PCT/JP2014/061134.
Taiwanese Office Action dated Jun. 3, 2017 in corresponding Taiwanese Patent Application No. 103117048.

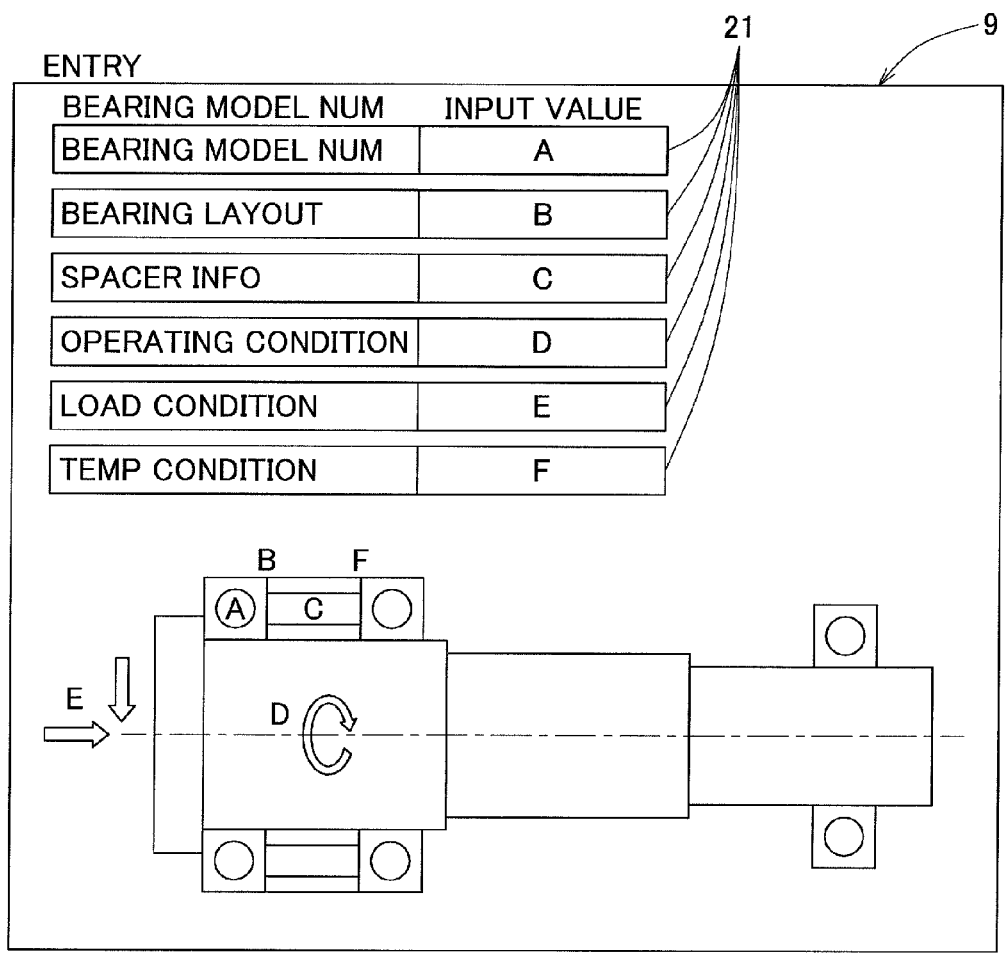

Fig. 5
AUTOMATIC CALCULATION SYSTEM
MAIN SHAFT LAYOUT GROUP
1 
2 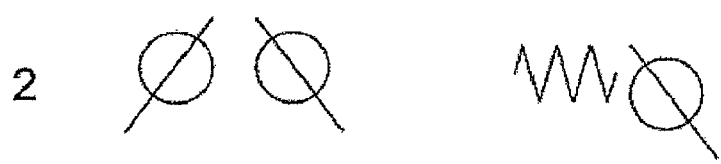
3 
4 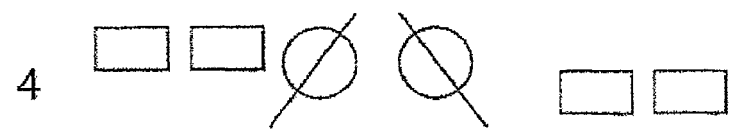

BEARING PERFORMANCE AUTOMATIC CALCULATION SERVICE DEVICE

CROSS REFERENCE TO THE RELATED APPLICATION

This application is a U.S. National Stage Application which claims the benefit under 35 U.S.C. 371 of PCT International Patent Application PCT/JP2014/061134 filed Apr. 21, 2014, which is based on and claims foreign priority benefit of Japanese patent application No. 2013-102968, filed May 15, 2013, the entire disclosure of which is herein incorporated by reference as a part of this application.

BACKGROUND OF THE INVENTION

Field of the Invention

The present invention relates to a bearing performance automatic calculation service device which: automatically evaluates performance of a bearing with respect to a determined evaluation item in the case where the bearing is used in a machine tool, an industrial machine, or the like; and provides notification of a result of the evaluation as a material or the like in order for a customer or the like in a remote location to select a bearing.

Description of Related Art

In the case of selecting a bearing product to be used in bearing-using equipment such as a machine tool or an industrial machine, it is necessary to know bearing performance regarding what state the bearing enters when the bearing is used in the bearing-using equipment under an actual operating condition or the like. If a customer can get to know such bearing performance through technical computing in an own personal computer or an automatic calculation service at any time, the customer can quickly know the bearing performance without obtaining the bearing performance from a sales person or the like, and thus it is easy for the customer to select a bearing suited for a purpose from among many types of bearings. Particularly, in the case of an overseas customer, due to a time difference, it is preferable to be able to use an automatic calculation service without a human intervention.

Hitherto, a download service of a bearing technical computing program is open on the Web.

In addition, an automatic calculation service device without a human intervention has been proposed which offers an automatic calculation service when, after logging in to a site for automatic calculation on the Web, main shaft information (a shaft structure, a bearing arrangement, a lubrication condition, an operating condition, and the like), a bearing model number, and the like are inputted and an execution command is made through an input window. The automatic calculation service device reads input data, performs calculation, automatically creates an output screen, and displays a calculation result in a window.

RELATED DOCUMENT

Patent Document

[Patent Document 1] JP Laid-open Patent Publication No. 2002-157299

SUMMARY OF THE INVENTION

After the bearing technical computing program is downloaded, calculation can be performed at any time. However, due to the computational power of a computer of a user, there is a limit for accurately knowing bearing performance.

An object of the present invention is to provide a bearing performance automatic calculation service device which allows a user to receive an automatic calculation service in an information processing terminal such as an own personal computer at any time in any location, which easily ensures reliability in terms of leakage of transmitted/received data, and which is easily used in terms of an input operation.

Hereinafter, in order to facilitate understanding of the present invention, the present invention will be described with reference to the reference numerals in embodiments.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 3 is an image view of an input format supported by the automatic calculation service device;

FIG. 4 is an image view of an example of output by the automatic calculation service device; and FIG. 5 is a diagram illustrating an example of bearing arrangements incorporated into the input formats.

DESCRIPTION OF EMBODIMENTS

Figure 1:
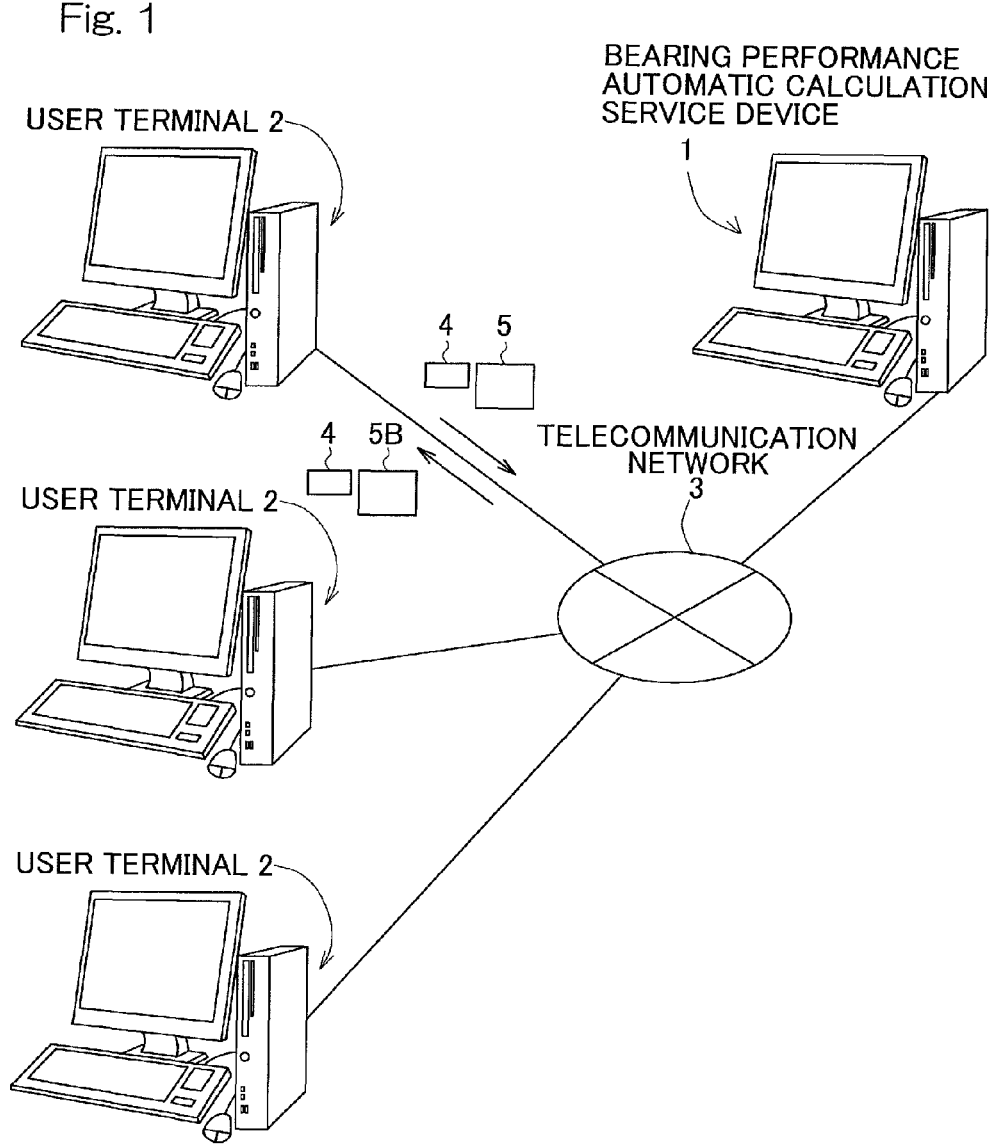
FIG. 1 is a diagram illustrating a relationship between user terminals and a bearing performance automatic calculation service device according to an embodiment of the present invention.

An embodiment of the present invention will be described with reference to the drawings. As shown in FIG. 1, a bearing performance automatic calculation service device 1 includes a digital circuit (not shown) such as a processor configured to perform various calculations, control, and the like. The device 1 performs a service of, with the processor, obtaining information from an attachment file 5 attached to an e-mail 4 sent from each of a plurality of user terminals 2 via a telecommunication network 3, performing evaluation of performance of bearings, adding evaluation results in the attachment file 5 or creating another attachment file containing the evaluation results, and sending back the file as a sending file 5B described later. A plurality of the processors may be provided, and, for example, the processor may be provided for each functional section. The telecommunication network 3 is a wide-range computer communication network using a telephone network or the like, such as the Internet. Each user terminal 2 may be any apparatus as long as it is an information processing apparatus capable of sending and receiving e-mails, such as a personal computer, a tablet portable information processing terminal, or a multifunctional mobile phone called a smartphone. The bearing performance automatic calculation service device 1 includes: a computer which includes the processor, a storage element, and the like; a program which is executed or used by the computer; and software such as data. The computer of the automatic calculation service device 1 may be a personal computer or a general-purpose one capable of performing high-speed arithmetic processing, or may be one including a plurality of computers connected to each other so as to be able to communicate with each other.

Figure 2:
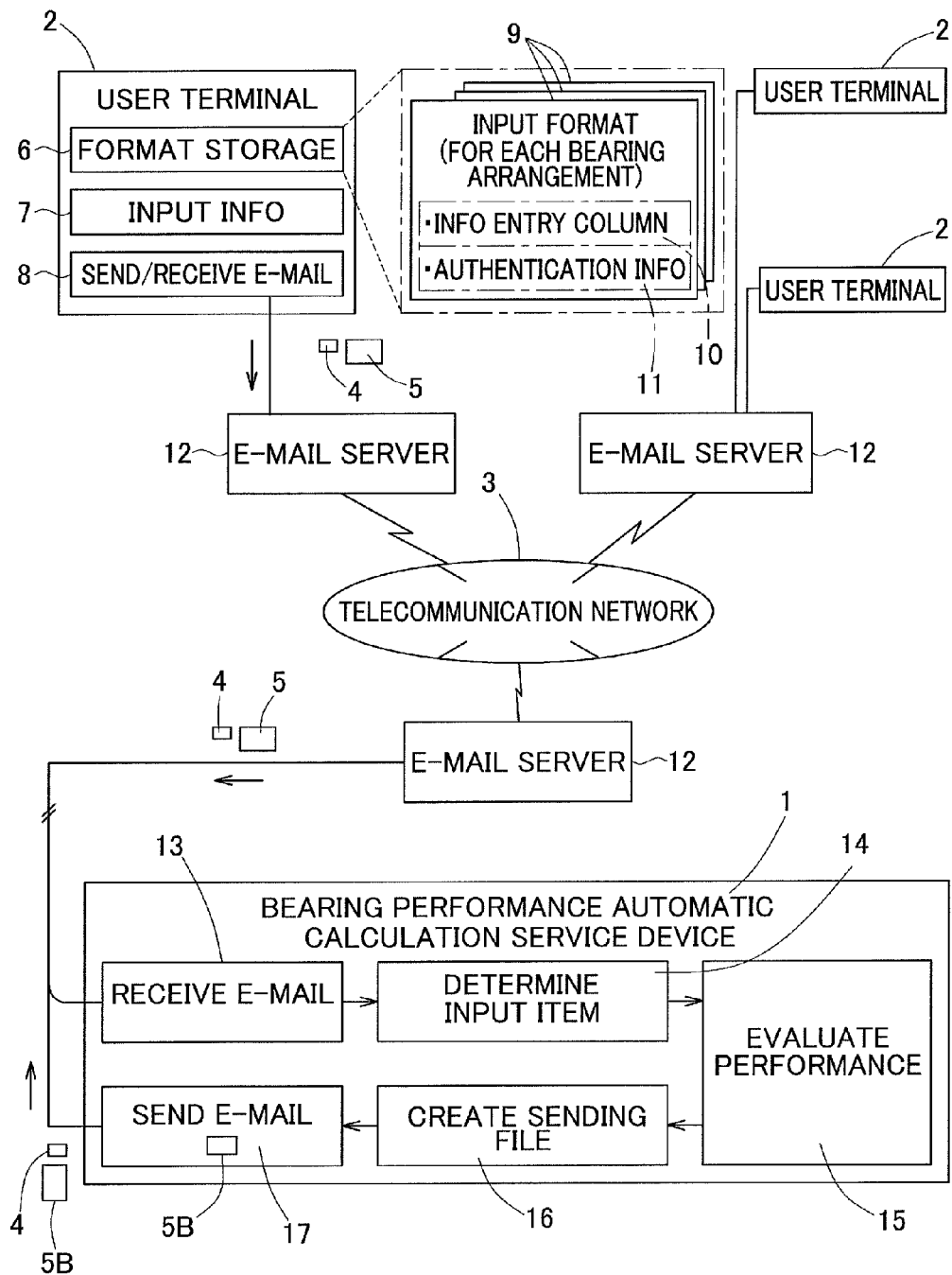
FIG. 2 is a block diagram showing schematic configurations of the automatic calculation service device and the user terminal.

FIG. 2 shows schematic configurations. Each user terminal 2 includes a functional module including a format storage 6, an information input module 7, and an e-mail sending/receiving module 8. The format storage 6 stores an input format 9 for the attachment file 5. In the attachment file 5 data required for receiving an automatic calculation service is listed. In this embodiment, the attachment file 5 includes a tabular file to be supported by spreadsheet software, for example, a file of Excel (registered trademark) of Microsoft Corporation, and has an information entry column 10 and authentication information 11. In the information entry column 10, characters or input values or the like of predetermined items regarding a bearing are listed, and a diagram showing a bearing arrangement form is presented as described later with reference to FIG. 3.

The input format 9 which can be supported by the automatic calculation service device 1, there are a plurality of types which are associated with respective bearing arrangement forms. The format storage 6 may have all the types of input formats 9 stored therein, or may have only one type thereof stored therein. The authentication information 11 is composed of, for example, a code of predetermined alphanumeric characters, and is presented in the input format 9 such that the authentication information 11 is not displayed when the attachment file 5 is displayed in a normal display mode. The input format 9 is provided to the user terminal 2 via a portable storage medium from a company or the like having the automatic calculation service device 1, or through downloading from a Web page.

The information input module 7 performs a process and assistance of inputting information to the attachment file 5 in accordance with the input format 9. The information input module 7 may cause the input format 9 to be displayed on an image display of the user terminal 2, such as a liquid crystal device, to cause characters or the like to be inputted to an entry column with a keyboard or the like, or may cause a plurality of items to be displayed on the image display to cause an operator to make a selection with a pointing device such as a mouse, a touch panel, or the like. In addition to the above, the information input module 7 may cause the operator to select the input format 9 from among a plurality of types in accordance with input or the like of the operator.

The e-mail sending/receiving module 8 sends and receives the e-mails 4 via the telecommunication network 3, and has a function to attach the attachment file 5. Specifically, sending/receiving of the e-mails 4 is performed between each user terminal 2 and an e-mail server 12 that can be used by the user terminal 2, and between the automatic calculation service device 1 and an e-mail server 12 that can be used by the automatic calculation service device 1. In addition, sending/receiving of the e-mails 4 via the telecommunication network 3 is performed between these e-mail servers 12.

The bearing performance automatic calculation service device 1 includes, as the above-described functional modules, an e-mail receiving module 13, an input item determination module 14, a performance evaluation module 15, a sending file creation module 16, and an e-mail sending module 17, and these modules are connected in this order. An e-mail address is assigned to the e-mail receiving module 13. The e-mail address is used only for receiving a request for an automatic calculation service. The e-mail receiving modules receives the e-mail 4 through the e-mail address. The e-mail receiving module 13 has a sorting function to pass the attachment file 5 to the input item determination module 14 only when the domain of the e-mail address of the sender of the e-mail 4 is included in registered domains. The e-mail receiving module 13 may pass the e-mail 4 to the input item determination module 14, or may pass only the attachment file 5 to the input item determination module 14. The sender e-mail address of the e-mail 4 is presented in the form of "(user name)@(domain)". The e-mail receiving module 13 registers the "(domain)" portion in registration storage (not shown) beforehand, and differentiates the e-mail 4 having one of the registered domains as an authenticated e-mail 4 for receiving an automatic calculation service, from other e-mails. The e-mail receiving module 13 may be configured to receive only the e-mail 4 having one of the registered domains.

The input item determination module 14 determines whether the file 5 attached to the e-mail 4 received by the e-mail receiving module 13 satisfies a condition that: the file 5 has the authentication information 11 indicating that the file 5 is entitled to an automatic calculation service; and information of a predetermined item regarding a bearing on which automatic calculation is performed exists in the predetermined input format 9. If the input item is inappropriate or the input item does not include all necessary items, the input item determination module 14 causes the e-mail sending module 17 to send the e-mail 4 with an error message back to the sender. The input item determination module 14 is configured to support the plurality of types of input formats 9 which are associated with respective bearing arrangement forms as described above, and also identifies the type of the input format 9 on the basis of appropriate information constituting the input format 9.

The performance evaluation module 15 is configured to read the information of the predetermined item regarding the bearing from the attachment file 5 which has been determined as satisfying the condition by the input item determination module 14, and to perform evaluation of performance of the bearing with respect to a determined evaluation item by means of a determined calculation formula. For example, the performance evaluation module 15 performs the evaluation by means of a calculation formula associated with each of the input formats 9. The performance evaluation module 15 includes information of a bearing life as an evaluation item to be calculated.

The sending file creation module 16 is configured to create a sending file 5B in a manner in which a result of the evaluation by the performance evaluation module 15 is added to the received file 5, or the result is listed in another file different from the received file 5.

The e-mail sending module 17 is configured to attach the sending file 5B created by the sending file creation module 16, to an e-mail 4 to be sent to the e-mail address of the sender of the received e-mail 4 or a destination e-mail address designated by the e-mail 4.

FIG. 3 is an image view of an example of the input format 9. The input format 9 is used practically as a format including more items than those in FIG. 3, but, for easy understanding, FIG. 3 shows only representative items.

In FIG. 3 the input format 9 can be linked to a tabular file supported by the spreadsheet software as described above, words "bearing model number", "bearing layout", "spacer information", "operating condition", "load condition", and "temperature condition" are presented as words indicating input items, and input boxes 21 in which input values are to be inputted are shown so as to be aligned with the portions where the respective words are presented. In addition, the input format 9 corresponds to a predetermined arrangement form of a bearing which supports a main shaft of a machine tool, and the arrangement form is displayed together with the main shaft in the diagram. That is, the bearing includes a single or plurality of bearings which support the main shaft of the machine tool. In the diagram showing the arrangement form, characters A to F are displayed, and in the respective input boxes 21, the characters A to F are presented in order to make it easy to recognize which portion in the arrangement form a value corresponds to. In each input box 21, information such as a corresponding value or a model number is inputted. Information for identifying the bearing in the arrangement form is also inputted, so that the attachment file 5 is created.

FIG. 4 shows an example of an output format 22 in a simplified manner. In the output format 22, a cell for the title of each evaluation item and an output value associated with the evaluation item, which has been calculated by the performance evaluation module 15 (FIG. 2), are presented so as to be aligned with each other. Output items (the evaluation items to be calculated by the performance evaluation module 15 (FIG. 2)) include a bearing characteristic value, main shaft rigidity, the life of the bearing, and the like.

The sending file 5B in which the output values are listed in the output format 22 is created so that the output values are listed as an additional portion of a table of the attachment file 5 or as another table.

FIG. 5 shows an example of a main shaft layout group, that is, bearing arrangement forms, which are supported by the automatic calculation service device 1. Characters "1" to "4" in FIG. 5 are identification characters showing the types of the arrangement forms. Each bearing arrangement form is displayed by a combination of illustrations showing the types of bearings.

According to the above-described configuration, since technical information is transmitted and received with the attachment file 5 of the e-mail 4, a user can use a bearing performance automatic calculation service by using an own information processing terminal at any time in any location, similarly to the case where input is performed on an input screen of a Web site. In addition, it is easy to ensure security against information leakage, as compared to the case where technical information which is inputted on an input screen of a Web site or the like is transmitted and received. Moreover, since the attachment file 5 can be created at any time prior to sending of the e-mail 4, can be confirmed, and also can be copied, it is easy to use the attachment file 5 in terms of operability and confirmability of input. Although depending on the attachment file 5, since the input format 9 is determined beforehand, necessary matters can be automatically and correctly read by the performance evaluation module 15 which performs calculation for performance evaluation.

Since the attachment file 5 has the authentication information 11, the attachment file 9 can be limited to one having a right of usage, so that it is possible to avoid an excessive load on the performance evaluation module 15 which performs advanced technical computing.

The input item determination module 14 supports the plurality of types of input formats 9 which are associated with respective bearing arrangement forms, and the performance evaluation module 15 performs the evaluation by means of the calculation formula associated with each of the input formats 9. Thus, the following advantages are obtained. Specifically, if a bearing arrangement form is different, conditions of a load applied to each bearing and the like are different, and a calculation method is also different. Thus, it is necessary to identify an arrangement form of bearings on which calculation is performed. However, if information for distinguishing the bearing arrangement form is presented in the attachment file 5 and then information of each bearing is detailed, the contents of the file would be complicated. On the other hand, since the input formats 9 are associated with respective arrangement forms, the attachment file 5 is simple and easily understood for arrangement form.

Since the attachment file 5 is a tabular file which is supported by the spreadsheet software, even if the number of the predetermined items showing information regarding a bearing is large, adding or modifying and reading of the attachment file 5 as well as displaying are performed orderly. In addition, since the diagram showing the bearing arrangement form is included, a selection of a wrong arrangement form is unlikely to occur, and it is easy to identify a bearing in the arrangement.

Particularly, in the case of a plurality of bearings which support the main shaft of the machine tool, types of arrangement forms are limited in number. On the other hand, a large number of bearings constitute the arrangements, and also a load to be applied to a bearing and a bearing type are different depending on a position in the arrangement. Thus, it is convenient to use the tabular file including a diagram showing a bearing arrangement form.

The items of the information regarding the bearing in the input format 9 include items of a bearing model number, a bearing layout, and an operating condition, and the evaluation items include information of a bearing life. By using the information of the model number, the layout, and the operating condition, calculation for evaluating performance of the bearing can be appropriately performed. In addition, since the evaluation items include the information of the bearing life, the user can know minimum information required for selecting a bearing product.

The e-mail receiving module 13 causes the input item determination module 14 to process the attachment file 5 only when the domain of the e-mail address of the sender of the e-mail 4 has one of the registered domains. Thus, the following advantages are obtained. Specifically, the input item determination module 14 performs authentication of the attachment file 5 on the basis of the authentication information 11, but before this, the e-mail receiving module 13 determines whether the e-mail 4 is received from a person who has a proper right to use the service, and accepts only the e-mail 4 indicating a proper right, whereby the input item determination module 14 is prevented from performing wasteful processing. The domain is information collectively indicating a limited range of users, and is a portion of an e-mail address. Thus, by using the domain, the determination as to whether the e-mail 4 is an e-mail indicating a proper right to use the service can be easily and appropriately performed.

In the above-described embodiment, the automatic calculation service device 1 has been described as being configured with: the computer including the processor and the like; the program; and the software. However, some or all of the functional portions included in the automatic calculation service device 1 may be configured with hardware which does not perform software processing, but includes, for example, a gate element and the like, and realizes respective functions thereof. As an example, the digital circuit may not be configured with a processor which performs software processing, and may be configured with hardware which includes, for example, a gate array and the like and realizes respective functions thereof.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . automatic calculation service device
2 . . . user terminal
3 . . . telecommunication network
4 . . . e-mail
5, 5B . . . file
6 . . . format storage
7 . . . information input module
8 . . . e-mail sending/receiving module
9 . . . input format
10 . . . information entry column
11 . . . authentication information
13 . . . e-mail receiving module
14 . . . input item determination module
15 . . . performance evaluation module
16 . . . sending file creation module
17 . . . e-mail sending module
22 . . . output format

What is claimed is:

1. A bearing performance automatic calculation service device comprising:
an e-mail receiving module configured to receive an e-mail via a telecommunication network, the e-mail receiving module having an e-mail address configured to only receive a request for an automatic calculation service;
an input item determination module configured to, by a digital circuit, determine whether a file attached to the e-mail received by the e-mail receiving module includes authentication information, and bearing information in a predetermined input format;
a performance evaluation module configured to, by a digital circuit, perform a bearing performance evaluation only when the authentication information and the bearing information is included in the file;
a sending file creation module configured to create a sending file, by a digital circuit, containing the bearing performance evaluation; and
an e-mail sending module configured to attach the created sending file to an e-mail and send the e-mail via the telecommunication network to an e-mail address of a sender of the e-mail or a destination e-mail address designated by the e-mail.

2. The bearing performance automatic calculation service device as claimed in claim 1, wherein the input item determination module supports a plurality of types of input formats which are associated with respective bearing arrangement forms, and the performance evaluation module performs the evaluation by means of a calculation formula associated with each of the input formats.

3. The bearing performance automatic calculation service device as claimed in claim 2, wherein the attached file is a tabular file supported by spreadsheet software, and includes a diagram showing a bearing arrangement form.

4. The bearing performance automatic calculation service device as claimed in claim 3, wherein the bearing includes a plurality of bearings which support a main shaft of a machine tool.

5. The bearing performance automatic calculation service device as claimed in claim 1, wherein the bearing information includes a model number of the bearing, a bearing layout, an operating condition, and information of a bearing life.

6. The bearing performance automatic calculation service device as claimed in claim 1, wherein the e-mail receiving module causes the input item determination module to perform the determination as to the attached file only when a domain of the e-mail address of the sender of the e-mail sent to the e-mail receiving module is included in a registered domain.

* * * * *